United States Patent [19]

Phillips et al.

[11] 4,351,586
[45] Sep. 28, 1982

[54] TERMINATION OF OPTICAL FIBERS

[75] Inventors: Michael J. Phillips, Stanstead; Aubrey M. Crick, Epping, both of England

[73] Assignee: International Standard Electric Corporation, New York, N.Y.

[21] Appl. No.: 679,759

[22] Filed: Apr. 23, 1976

[30] Foreign Application Priority Data

May 6, 1975 [GB] United Kingdom ............... 18930/75

[51] Int. Cl.³ ............................................... G02B 7/26
[52] U.S. Cl. ................... 350/96.20; 29/464; 368/324
[58] Field of Search ............... 350/96 C, 96 B, 96 R, 350/96.20, 96.21; 58/140 R; 29/464, 466, 467, 468; 368/324

[56] References Cited

U.S. PATENT DOCUMENTS

| 2,645,078 | 7/1953 | Bulova | 58/140 R |
|---|---|---|---|
| 3,158,988 | 12/1964 | Walmer | 58/140 R |
| 3,849,011 | 11/1974 | Berthoud | 58/140 R |
| 3,861,781 | 1/1975 | Hasegawa et al. | 350/96 C |
| 3,870,395 | 3/1975 | Schicketanz | 350/96.21 |
| 3,871,744 | 3/1975 | Bridger et al. | 350/96 C |
| 3,902,785 | 9/1975 | Mathews | 350/96 C |
| 3,948,582 | 4/1976 | Martin | 350/96.21 |
| 3,976,355 | 8/1976 | Matthews | 350/96.21 |
| 4,015,894 | 4/1977 | Rocton | 350/96 C |
| 4,080,044 | 3/1978 | Gousseau | 350/96.15 |

FOREIGN PATENT DOCUMENTS 1458896 12/1976 United Kingdom .

OTHER PUBLICATIONS

"Fibre Optic Connectors an Effective Solution", Electronic Engineering, Apr. 1975.

Primary Examiner—John D. Lee
Attorney, Agent, or Firm—Thomas L. Peterson

[57] ABSTRACT

A watch pierced bearing jewel forms the end of a sheathed optical fiber termination. The jewel is located on axis of a ferrule. The fiber is threaded through the jewel aperture and cemented in position. The jewel and ferrule may be held concentric in a resilient molded jig during assembly of the fiber thereto.

8 Claims, 3 Drawing Figures

TERMINATION OF OPTICAL FIBERS

BACKGROUND OF THE INVENTION

This invention relates to terminations for sheathed optical fibers.

For many applications, the positioning of the core at the end of an optical fiber is very critical on account of its small size. For some applications, this positioning can be determined optically by directing light down the fiber, and observing from where it emerges. For other applications, this is not convenient, and positioning has to be determined mechanically be reference to a surface which is attached to, or forms part of, the fiber. In the case of a sheathed optical fiber, the sheath itself does not normally provide a satisfactory reference surface because the fiber core and cladding are not necessarily coaxial with the sheath. The cladding is a potentially satisfactory reference surface because the core is normally accurately centered within the cladding. (In the case of a graded index fiber having no distinct separate cladding, the fiber itself is similarly a potentially satisfactory reference surface). An unsheathed fiber is, however, very fragile, and hence it is convenient to provide a mechanical reference surface, in the form of a ferrule, into one end of which the sheathed fiber is inserted and secured with the fiber core lying accurately on axis at the other end of the ferrule. This invention is concerned with the problem of obtaining the necessary fiber alignment at the free end of the ferrule.

SUMMARY OF THE INVENTION

According to the principal aspect of the present invention, there is provided a sheathed optical fiber termination comprising a hollow cylindrical ferrule through which the fiber is threaded with its sheathing terminating within the ferrule and in which the fiber is secured. The ferrule terminates at one end with a cylindrical bushing having an axial aperture which receives the unsheathed portion of the fiber threaded therethrough.

DESCRIPTION OF THE PREFERRED EMBODIMENTS

Figure 1:
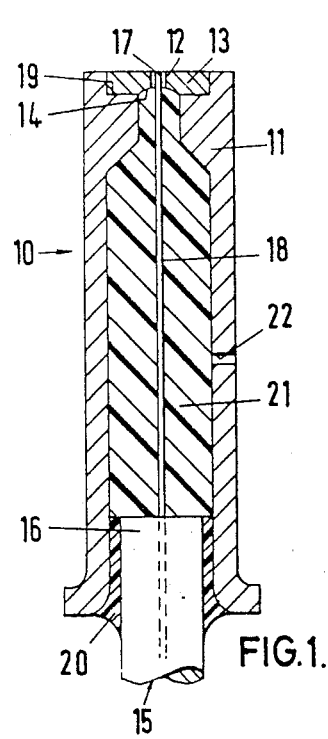
FIG. 1 is a longitudinal section through a completed optical fiber termination made by one method.

Referring to FIG. 1 in detail, an optical fiber termination 10 consists essentially of a steel ferrule 11 having an accurately centered small hole 12 in a bushing 13 at one end of the ferrule. Preferably, the bushing comprises a watch pierced bearing jewel. The hole 12 is dimensioned to have a sliding fit over a bare fiber, having a diameter typically of about 65 $\mu$m, while the bore of the ferrule 11 is dimensioned to accommodate the plastic sheathing on a fiber, which typically has a diameter of about 1.0 mm. The ferrule is typically 1.8 mm in external diameter and 12.5 or 25 cm in length. This composite structure of ferrule and bushing is easier to provide and thread with the stripped end of a sheathed optical fiber than would be a unitary structure having such a fine hole at the end of such a slender ferrule. It will be noted that the location of the jewel on the axis of the ferrule has to be no less accurate than the location of the hole in the unitary structure, but it is easier to machine accurately a hole to have an interference fit accommodating the jewel than it would be to machine a 65 $\mu$m hole to the same depth. Furthermore, the polish on the surface of a jewel facilitates the centering of a fiber end to enable it to thread the central aperture, whereas machining a 65 $\mu$m hole is liable to leave an internal surface whose roughness will tend to hinder the centering of the fiber end. It is preferred to mount the jewel 13 with its oil retaining recess 14 facing into the ferrule, as it is believed that this will tend to help guide the fiber end into the central aperture 12.

A length of plastic sheathed glass optical fiber 15 is stripped of its sheath 16, and the end parted so as to leave an optically finished end surface 17. The length of bare fiber 18 extending beyond the plastic sheathing 16 is made about 1.5 mm shorter than the ferrule. A jewel 13, having an aperture size appropriate for the diameter of the bare fiber 18, is selected and pressed home in a pre-prepared interference fit recess 19 in the end of the ferrule 11. The stripped end of the fiber is then held vertically, and the assembly of ferrule and jewel carefully threaded over it until the fiber supports the assembly. At this stage, if light is launched into the other end of the fiber, the point at which the light emerges from the fiber will show through the translucent jewel. The sheath is then gently vibrated by lightly tapping it until the fiber is centered, whereupon the ferrule descends down the fiber. A manipulator is then used to withdraw the fiber back into the ferrule until it is seen, with the aid of a microscope, so that the fiber end is flush with the front face of the jewel. At this stage, the sheath is secured to the ferrule by applying a fillet 20 of quick setting adhesive, such as cyanoacrylate adhesive, around the point of emergence of the sheath from the ferrule. Optionally, the free space inside the ferrule may be filled with an epoxy resin 21 injected through a side hole 22.

Figure 2:
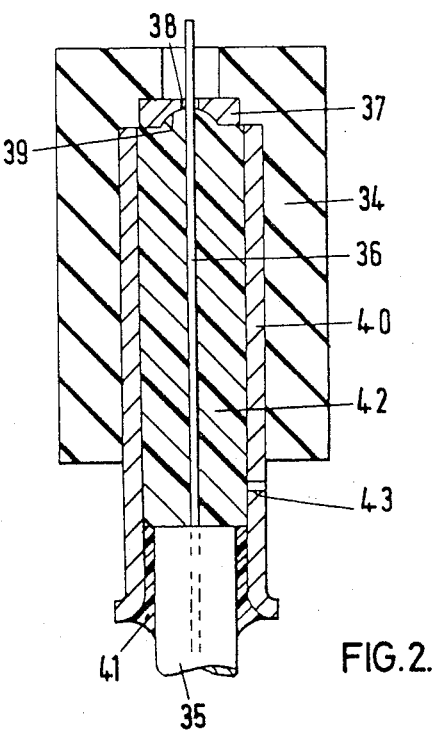
FIG. 2 is a longitudinal section through a mold for making a resilient jig for making a termination by an alternative method.

A critical requirement in the manufacture of the above described optical fiber termination is the accurate machining of the recess 19 in the ferrule so that the jewel insert 13 shall lie exactly concentric with the outer surface of the ferrule. This requirement for such a recess is avoided in the alternative method of making a termination now to be described with reference to FIG. 2. This method has features in common with the method of making optical fiber terminations described in our copending application entitled, "Method of Terminating Optical Fibers", Ser. No. 672,650 filed Apr. 1, 1976.

A metallic mold 24 for making a circularly symmetric resilient jig consists essentially of a base 25, a central pin 26, a tube 27, and a lid 28. A shallow blind hole 29 is machined in the base 25 to house the end of the tube 27 and a further blind hole 30 of smaller diameter is machined to house the base of the pin 26. The main body portion of the pin is just smaller in diameter than the ferrule that is to be used in making the termination. On top of this is a portion 31 having a diameter just smaller than that of the pierced watch jewel that is to be used in making the termination. Particular care is taken to insure that the main body portion and the portion 31 are accurately concentric. A smaller diameter portion 32 extends from the top of portion 31 and is freely accommodated in a central hole 33 in the lid 28. The mold is filled with a room temperature vulcanising silicone rubber 34 to form the jig, the lid 28 is pressed home and the rubber is cured. When the lid is fitted on the tube 27, a small quantity of the rubber may enter the hole 33 in the lid, but the sprue so formed is removed after removal of the jig 34 from the mold 24.

Figure 3:
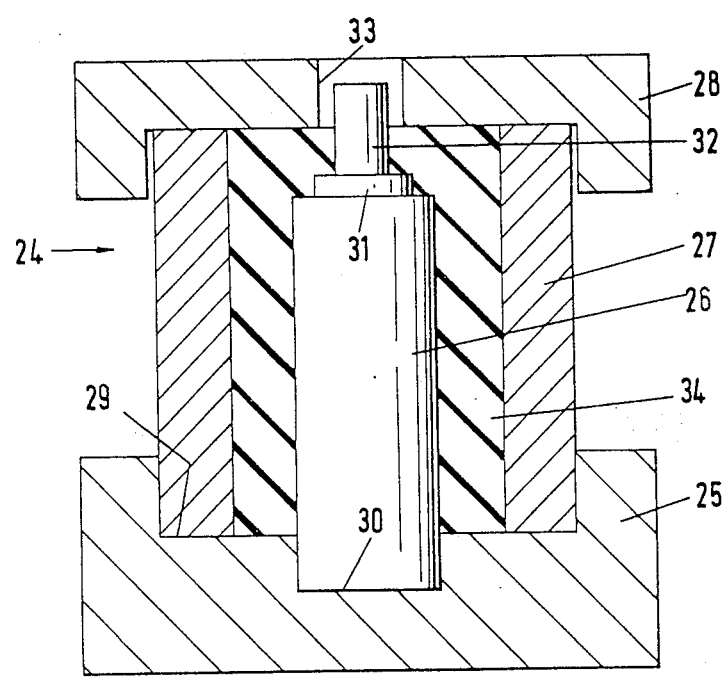
FIG. 3 is a longitudinal section through an incompleted optical fiber termination made by the alternative method.

Referring now to FIG. 3, the end of a plastic sheathed optical fiber 35 is prepared for forming the termination by stripping the sheathing from an end portion to expose a length 36 of bare fiber. A watch pierced bearing jewel 37 is selected that has a small as possible an aperture 38 as is consistent with being able to thread the bare fiber through it. This jewel is located in the jig 34, which has now been removed from the mold 24, in the position created by the portion 31 of the pin 26. In order to facilitate subsequent threading of the bared fiber, it is preferred to locate the jewel with its oil retaining recess 39 facing the open end of the jig. Next a steel ferrule 40 is inserted into the jig in the position created by the main body of the pin 26, and then the bared end of the sheathed fiber is introduced into the ferrule until the end comes to rest against the face of the jewel. With the fiber held vertical, the assembly is vibrated to make the fiber end center itself, guided by the polished oil retaining recess 39, whereupon the assembly descends further down the fiber under the action of gravity. When the bared end of the fiber protrudes through the jewel at one end of the ferrule, and the sheath has entered a short distance, typically 1 to 2 mm, into the other end, the sheath is secured to the ferrule by applying a fillet 41 of a quick setting adhesive, such as cyanoacrylate adhesive, to the region where the sheath emerges from the ferrule. Then the interior of the ferrule is filled with epoxy resin 42 introduced with a syringe through a hole 43 in the side of the ferrule. Finally, after the resin has been cured, and the ferrule and its now attached jewel removed from the jig, the exposed end face of the jewel is lapped and polished to provide the fiber end with an optical finish.

It may be noted that with this second method of making a termination, it is necessary to machine two accurately concentric surfaces on a single pin in order to make a mold, which can then be used to make a quantity of jigs, each of which can be re-used a number of times to make a quantity of terminations. This contrasts significantly with the first method, in which each termination requires accurate machining of its jewel recess so that it shall be accurately concentric with the outer surface of the ferrule. Further, it may be noted that in the second method, the actual diameters of the surfaces required to be accurately concentric are not critical, so long as concentricity is retained. It will be appreciated that the desired concentricity of the fiber with the ferrule relies upon the use of a bushing whose central aperture is accurately concentric with its outer curved surface, but the watch jewel industry provides a source of supply of such bushings of suitable quality, in the form of pierced bearing watch jewels.

The ferrule of FIG. 1 has three sections each having a different bore diameter. The two end sections, accommodating respectively the jewel 13 and the fiber sheath 16, are linked by a smaller diameter imtermediate section providing a locating shoulder for the jewel. In a modified version employing a simplified configuration of ferrule, the intermediate section is dispensed with and the bore for accommodating the jewel extends straight into the larger bore accommodating the fiber sheath.

Although, in the termination of FIG. 1 of the drawing, the front face of the jewel is shown as being flush with the forward end of the ferrule, this is not a necessary feature, particularly if the optical finish to the fiber end is to be provided by lapping and polishing after manufacture of the termination instead of before it. When the end is to be lapped and polished, the jewel is preferably recessed with respect to the end of the ferrule and the jewel is buried in resin so that the lapping erodes resin rather than the harder material of the jewel.

What is claimed is:

1. A sheathed optical fiber termination comprising:
    a hollow cylindrical ferrule;
    an optical fiber mounted lengthwise in said ferrule and having its sheathing terminating within said ferrule leaving a forward unsheathed end portion of said fiber in said ferrule;
    a pierced watch bearing jewel fixedly mounted at the forward end of said ferrule having an aperture therein coaxial with the center axis of said ferrule; and
    said unsheathed end portion of said fiber being threaded into said aperture.

2. A sheathed optical fiber termination as set forth in claim 1 wherein:
    said watch pierced bearing jewel has an oil retaining recess facing into said ferrule.

3. A sheathed optical fiber termination as set forth in claim 1 wherein:
    said ferrule is filled with an epoxy resin.

4. A sheathed optical fiber termination as set forth in claim 3 wherein:
    said jewel is outside of said forward end of said ferrule and supported thereon by said epoxy resin filler.

5. A sheathed optical fiber termination as set forth in claim 1 wherein:
    the outer surface of said jewel is flush with said forward end of said ferrule.

6. A method of making a sheathed optical fiber termination comprising the steps of:
    using a circularly symmetric jig to hold a bushing having a central aperture therein coaxially with and in front of the forward end of a hollow cylindrical ferrule;
    inserting a sheathed optical fiber having an unsheathed end portion into said ferrule from the rear end thereof until the sheathing of the fiber terminates within said ferrule;
    threading said unsheathed fiber end portion into said central aperture in said bushing; and
    thereafter introducing a resin into said ferrule to fill the same and allowing said resin to cure.

7. An optical fiber contact comprising:
    a tubular ferrule having a forward end; and
    a pierced watch bearing jewel fixedly mounted at the forward end of said ferrule having a center aperture therein adapted to receive the end of an optical fiber mounted lengthwise in said ferrule.

8. An optical fiber termination comprising:
    a tubular ferrule having a forward end and a rear end;
    a pierced watch bearing jewel fixedly mounted at the forward end of said ferrule having a center aperture therein; and
    a single optical fiber extending into said ferrule from said rear end and having a forward end portion threaded into said aperture, said forward end portion of said fiber being the only optical fiber located in said aperture.

* * * * *